(12) United States Patent
Srinivasa et al.

(10) Patent No.: US 6,950,813 B2
(45) Date of Patent: Sep. 27, 2005

(54) FUZZY INFERENCE NETWORK FOR CLASSIFICATION OF HIGH-DIMENSIONAL DATA

(75) Inventors: Narayan Srinivasa, Moorpark, CA (US); Swarup S. Medasani, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 447 days.

(21) Appl. No.: 09/840,286

(22) Filed: Apr. 23, 2001

(65) Prior Publication Data

US 2003/0018592 A1 Jan. 23, 2003

(51) Int. Cl.[7] .............................. G06F 9/44; G06N 7/02; G06N 7/06
(52) U.S. Cl. .............................. 706/52; 706/47; 706/46
(58) Field of Search .............................. 706/52, 47, 46; 187/385

(56) References Cited

U.S. PATENT DOCUMENTS 5,252,789 A * 10/1993 Sirag et al. .................. 187/385

FOREIGN PATENT DOCUMENTS

EP         0607613         7/1994

OTHER PUBLICATIONS

Cai, L. Y. and Kwan, H. K., "Fuzzy Classifications Using Fuzzy Inference Networks," IEEE Transactions on Systems, Man, and Cybernetics—Part B: Cybernetics, vol. 28, No. 3, Jun. 1998, 1083–4419/98, pp. 334–347.

Juang, C. F., and Lin, C. T., "An On–Line Self–Constructing Neural Fuzzy Inference Network and Its Application," IEEE Transactions on Fuzzy Systems, vol. 6, No. 1, pp. 12–32, Feb. 1998.

Carpenter, G. A., and Grossberg, S., "The ART of adaptive pattern Recognition by a self–organizing neural network," Computer, vol. 21, pp.77–88, 1988.

Carpenter G. A., Grossberg, S., Markuzon, N., Reynolds, J.H., Rosen, D.B., "Fuzzy ARTMAP: A Neural Network Architecture for Incremental Supervised Learning of Analog Multidimensional Maps," IEEE Transactions on Neural Networks, vol. 3, No. 5, pp.698–712, Sep. 1992.

Marriott S., and Harrison, R. F., "A modified fuzzy ART-MAP architecture for approximation of noisy mappings," Neural Networks, vol. 2, pp. 359–366, 1995.

(Continued)

Primary Examiner—Joseph P. Hirl
(74) Attorney, Agent, or Firm—Tope-McKay & Associates

(57) ABSTRACT

The present invention provides an improved method and system for training an on-line fuzzy inference network to generate a rule base, and a rule base generated thereby. Tuning and applying a learning rule to the fuzzy rules generated by the fuzzy inference network in such as manner as to divorce the performance of the network from the number of input dimensions allows the present invention to adapt a fuzzy inference network such as a SONFIN to be effective for the classification of high-dimensional data in problems requiring the use of a high number of dimensions such as occupant recognition in vehicles, weather forecasting, and economic forecasting.

19 Claims, 5 Drawing Sheets

OTHER PUBLICATIONS

Williamson, J.R., "Gaussian ARTMAP: A neural network for fast incremental learning of noisy multidimensional maps," Neural Networks, vol. 9, pp. 881–997, 1996.

Srinivasa, N., "Learning and generalization of Noisy Mappings Using a Modified PROBART Neural Network," IEEE Transactions on Signal Processing, vol. 45, No. 10, pp. 2533–2550, Oct. 1997.

Lee C. C., "Fuzzy Logic in control systems: Fuzzy logic controller—Part II," IEEE Transactions on Systems, Man and Cybernetics, vol. 15, pp. 419–435, Mar./Apr. 1990.

Jang J.S. , "ANFIS: Adaptive–network–based fuzzy inference system," IEEE Transactions on Systems, Man and Cybernetics, vol. 23, pp. 665–695, May 1993.

Takagi, T. and Seguno, M., "Fuzzy identification of systems and its applications to modeling and control," IEEE Transactions on Systems, Man and Cybernetics, vol. 15, pp. 116–132, Jan. 1985.

Wang, L. X., and Mendel, J. M., "Generaling fuzzy rules by learning from examples," IEEE Transactions on Systems, Man and Cybernetics, vol. 22, No. 6, pp. 1414–1427, Nov./Dec. 1992.

Beyer, K., Goldstein, J., Ramakrishnan, R., and Shaft, U., "When is Nearest Neighbor Meaningful?", Proc. Of Seventh International Conference on Database Theory, Jerusalem, Israel, 1999.

Inoue, H. et al., "Rule pairing methods for crossover in GA for automatic generation of fuzzy control rules," Fuzzy Systems Proc., 1998. IEEE World Congress on Computational Intelligence, The 1998 Int. Conf. on Anchorage, AK, USA May 4–9, 1988, NY, pp. 1223–1228, XP010287452.

Reignier, P., "Supervised incremental learning of fuzzy rules," Robotics and Autonomous Systems, Elsevier Schience Publishers, Amsterdam, NL, vol. 71, No. 1, Nov. 1, 1995, pp. 57–71, XP004001938.

Lin, C., et al., "Fuzzy adaptive learning control network with on–line neural learning," Fuzzy Sets and Systems, Elsevier Science Publishers, Amsterdam, NL, vol. 71, No. 1, Apr. 14, 1995, pp. 25–45, XP004013341.

* cited by examiner

| Data Set | SOFIN | | M-PROBART | | Our Invention | |
|---|---|---|---|---|---|---|
| | Test set accuracy (%) | Number of Rules | Test set accuracy (%) | Number of Rules | Test set accuracy (%) | Number of Rules |
| 1 | 89 | 57 | 98.1 | 103 | 97.9 | 28 |
| 2 | 79 | 89 | 96.2 | 172 | 95.5 | 51 |
| 3 | 89 | 102 | 94.1 | 235 | 94.3 | 70 |

Fig. 5

FUZZY INFERENCE NETWORK FOR CLASSIFICATION OF HIGH-DIMENSIONAL DATA

TECHNICAL FIELD

The present invention relates generally to data processing systems and methods. More specifically, it relates to the generation of an artificial neural network-generated fuzzy expert system from which an accurate, compact, interpretable, and meaningful set of rules may be extracted.

BACKGROUND

Classification algorithms based on on-line learning, such as artificial neural networks, have the ability to abstract relationships between inputs and their corresponding classification labels in an incremental fashion. As more points of the input/output mapping are sampled, the algorithm is capable of creating decision boundaries that separate the various classes in a non-linear fashion. An important class of on-line learning algorithms is based on adaptive resonance theory (ART). ART-based learning systems are capable of on-line learning and classification of both binary and analog inputs. Several variants of ART systems can be found in the literature such as Fuzzy-ARTMAP, PROBART, and Gaussian ARTMAP. These systems are capable of on-line supervised learning. The main drawback with these algorithms is their sensitivity to noise in the training data that leads to the creation of a prohibitively large number of rules for classification. Efforts have been undertaken to develop techniques to minimize sensitivity to noise as well as to improve the ratio between accuracy of prediction to the number of rules required for classification. In addition to their noise sensitivity, ART-based learning systems are not amenable to implementation in hardware, as several additional steps must be taken in order to extract rules that can be put into a fuzzy inference form. Because of this, ART-based learning systems are generally implemented as software, which is substantially slower than an analogous hardware system would be. This is also compounded by the fact that these algorithms tend to generate a large number of classification rules.

Another class of on-line learning algorithms is based on the extraction of knowledge in the form of fuzzy rules by tuning the parameters of a fuzzy logic inference network. Traditionally, fuzzy systems consist of a set of fuzzy IF-THEN rules that are derived based on knowledge of a domain expert. Inferences on the output for a new input are then made based on these rules using the fuzzy inference network. This approach is, however, based on heuristic observation of the system by the expert to extract the appropriate rules. To overcome this deficiency, there are several approaches aimed at deriving fuzzy IF-THEN rules directly from numerical data observed from the system. Predominantly, these approaches depend on optimization of fuzzy system parameters in an off-line fashion from numerical data to obtain the fuzzy rules. Thus, these systems are incapable of incremental learning.

Another class of learning systems is the fuzzy inference network, an example of which is the self-constructing fuzzy inference network (SONFIN). The SONFIN is capable of deriving a fuzzy rule base in a self-organized and on-line fashion from numerical data. Since the SONFIN architecture is designed based on fuzzy inference systems, the network can make inferences on any given input data based on its rule base at any given time. This makes the SONFIN an attractive network for many real-time applications where the environment is changing dynamically and yet there is a need to abstract knowledge from the system in the form of fuzzy rules. The SONFIN performs very well for classification/functional mapping of low-dimensional input data. However, when the dimensions of the input space increases (such as where the number of input features exceeds 10), the algorithm is ineffective for learning because of a problem associated with the learning rule. The inability to perform adequate learning essentially converts the SONFIN into a poor clustering algorithm, thus leading to poor learning and prediction capabilities as well as a larger number of fuzzy rules.

A flow diagram depicting the operation of the SONFIN is provided in FIG. 1. A portion of the flow diagram represents a generic fuzzy inference network 100. The SONFIN provides the adaptations necessary to provide on-line learning. In an inputting step 102, an N-dimensional input pattern is provided to the fuzzy inference network 100. The fuzzy inference network 100 then computes the membership values for each input dimension for each rule in a membership value computation step 104. The firing strength of the rules is determined based on the input and is checked to determine whether it exceeds a predetermined threshold in a firing strength checking step 106. If the firing strength exceeds the threshold, then the fuzzy inference network 100 computes normalized rule strengths for the rule in a normalizing step 108. The fuzzy inference network 100 then computes an output using centroid defuzzification in a defuzzifying step 110. In the steady-state operation of a trained network, the result of the defuzzifying step 110 is the output of the fuzzy inference network 100. In the SONFIN, the output of the fuzzy inference network 100 is provided to a back-propagation algorithm where the rule parameters are updated in a back-propagating step 112. A check is made to determine whether there are more inputs, and the cycle begins again. If the firing strength of the rules was less than the threshold, and if the rule does not satisfy a fuzzy similarity measure, then a new rule is created with new membership functions along each input dimension in a rule-creating step 114.

Although SONFIN provides a self-organized and on-line learning system, it suffers from a major drawback because its performance is dependent on the number of input dimensions. Thus, SONFIN is effectively useless for on-line classification of high-dimensional data such as that occurring in applications such as vehicle occupant sensing, weather forecasting, and stock market analysis/economic forecasting.

It is therefore desirable to provide a self-organized, on-line learning system, the performance of which is independent of the number of input dimensions. Because such a system would be capable of elucidating its learned knowledge in the form of fuzzy rules, the system can be evaluated with new data using those rules without any delays, thus saving considerable time and data collection effort while developing a learning system. Another advantage is that if increasing the number of input dimensions increased the number of features, there would be no need for crafting the parameters of the network and the system would not suffer in its learning ability. Thus, the system would be more robust and flexible for evaluating different classification strategies. References of interest relative to neural networks and their use in classification involving high-dimensional problems include the following:

1. Juang, C. F., and Lin, C. T., "An On-Line Self-Constructing Neural Fuzzy Inference Network and Its Application," *IEEE Transactions on Fuzzy Systems*, vol. 6, no. 1, pp. 12–32, February 1998.
2. Carpenter, G. A., and Grossberg, S., "The ART of adaptive pattern recognition by a self-organizing neural network," *Computer*, vol. 21, pp. 77–88, 1988.
3. Carpenter, G. A., Grossberg, S., Markuzon, N., Reynolds, J. H., Rosen, D. B., "Fuzzy ARTMAP: A Neural Network Architecture for Incremental Supervised Learning of Analog Multidimensional Maps," *IEEE Transactions on Neural Networks*, vol. 3, no. 5, pp. 698–712, September 1992.
4. Marriott S., and Harrison, R. F., "A modified fuzzy ARTMAP architecture for approximation of noisy mappings," *Neural Networks*, vol. 2, pp. 359–366, 1995.
5. Williamson, J. R., "Gaussian ARTMAP: A neural network for fast incremental learning of noisy multidimensional maps," *Neural Networks*, vol. 9, pp. 881–997, 1996.
6. Srinivasa, N., "Learning and generalization of Noisy Mappings Using a Modified PROBART Neural Network," *IEEE Transactions on Signal Processing*, vol. 45, no. 10, pp. 2533–2550, October 1997.
7. Lee, C. C., "Fuzzy Logic in control systems: Fuzzy logic controller—Part II," *IEEE Transactions on Systems, Man and Cybernetics*, vol. 15, pp. 419–435, March/April 1990.
8. Jang, J. S., "ANFIS: Adaptive-network-based fuzzy inference system," *IEEE Transactions on Systems, Man and Cybernetics*, vol. 23, pp. 665–685, May 1993.
9. Takagi, T. and Seguno, M., "Fuzzy identification of systems and its applications to modeling and control," *IEEE Transactions on Systems, Man and Cybernetics*, vol. 15, pp. 116–132, January 1985.
10. Wang, L. X., and Mendel, J. M., "Generating fuzzy rules by learning from examples," *IEEE Transactions on systems, Man and Cybernetics*, vol. 22, no. 6, pp. 1414–1427, Nov./Dec. 1992.
11. Beyer, K., Goldstein, J., Ramakrishnan, R., and Shaft, U., "When is Nearest Neighbor Meaningful," *Proc. Of Seventh International Conference on Database Theory*, Jerusalem, Israel, 1999.

SUMMARY OF THE INVENTION

The present invention provides a method and system for generating an on-line learning inference network for the classification of high-dimensional data using an on-line fuzzy inference network, trained in order to generate a rule base. The rule base generated by the present invention may be embodied in either software operated on a general or special purpose computer or in hardware. The present invention divorces the dependency of the performance of the fuzzy inference engine from the number of dimensions of the input data.

More specifically, an embodiment of the present invention provides a method for improved classification of high-dimensional data using an on-line learning fuzzy inference network, wherein the fuzzy inference network generates a rule base of fizzy rules, with each fuzzy rule assigned to a class label, and each fuzzy rule including at least one membership function corresponding to a dimension of the data, with each membership function including membership function parameters, wherein the fuzzy rules are used for classifying input data into memberships, wherein test data with a known classification membership is provided to the fuzzy inference network and wherein the fuzzy inference network uses the fuzzy rules to generate classification memberships for the test data by firing the fuzzy rules with each fizzy rule fired assigned a firing strength based on its match to the test data, and determining the fuzzy rule having the greatest firing strength, where the membership functions of the rule having the greatest firing strength are compared to the known classification membership of the test data to determine classification error and wherein the firing frequency count of each fuzzy rule is stored, the improvement comprising the steps of:

determining whether the firing strength of the fuzzy rule having the greatest firing strength exceeds a predetermined threshold;

in the case where the firing strength of the fuzzy rule having the greatest firing strength exceeds the threshold, tuning the fuzzy rule based on the classification error; and in the case where the firing strength of the fuzzy rule having the greatest firing strength does not exceed the threshold, determining whether the classification membership generated by the fuzzy rule having the greatest firing strength correctly matches the known classification membership of the test data;

in the case where the classification membership generated by the fuzzy rule having the greatest firing strength does not correctly match the known classification membership of the test data, tuning the fuzzy rule based on the classification error as in; and in the case where the classification membership generated by the fuzzy rule having the greatest firing strength correctly matches the known classification membership of the test data, applying a learning rule to update the membership function parameters such that the classification error is minimized for high-dimensional classification tasks.

In a further embodiment of the present invention, the tuning step of the method for improved classification of high-dimensional data using an on-line learning fuzzy inference further comprises the sub-steps of:

applying a fuzzy similarity measure to compare the membership function along each dimension of the test data with the test data;

adding a new membership function along those dimensions where the fuzzy similarity measure is not satisfied;

creating a new fuzzy rule including the new membership functions and those membership functions that satisfied the fuzzy similarity measure; and adding the new rule to the rule base.

In a still further embodiment of the present invention, the tuning step of the method for improved classification of high-dimensional data using an on-line learning fuzzy inference network further includes the sub-steps of:

assigning a mean value to each new membership function equal to the value of the test data corresponding to the dimension corresponding the respective new membership function;

incrementing the firing frequency count for the new fuzzy rule; and assigning a classification membership to the new fuzzy rule matching the classification membership of the test data for which the rule fired.

Non-limiting examples of membership functions useful for the present invention include Gaussian membership functions, triangular membership functions, and trapezoidal membership functions. Preferably, however, Gaussian membership functions are used.

In another embodiment of the method of the present invention, and wherein the membership functions are Gaussian membership functions, the membership function parameters of each Gaussian membership function include a mean and a variance, and the learning rule updates the mean and variance of the Gaussian membership functions of the fuzzy rule having the greatest firing strength according to:

$$\mu^* = \left(1 - \frac{|e|}{f}\right)\mu + \frac{|e|}{f}x, \text{ and}$$

$$\sigma^* = \sqrt{\left(1 - \frac{|e|}{f}\right)\sigma^2 + \frac{|e|}{f}(\sigma - x)^2}, \text{ where}$$

where $\mu^*$ represents the updated mean of the Gaussian membership function, $\sigma^*$ represents the updated variance of the Gaussian membership function, $\mu$ represents the non-updated mean a of the Gaussian membership function, $\sigma$ represents the non-updated variance of the Gaussian membership function, $|e|$ represents the classification error for the Gaussian membership function, x represents the particular value of the test data for the dimension corresponding to the Gaussian membership function, and f represents the firing frequency for the particular fuzzy rule to which the learning rule is applied.

In another embodiment of the method of the present invention, the method further comprises providing an on-line learning fuzzy inference network, wherein the fuzzy inference network generates a rule base of fuzzy rules, with each fuzzy rule assigned to a class label, and each fuzzy rule including at least one membership function corresponding to a dimension of the data, with each membership function including membership function parameters, wherein the fuzzy rules are used for classifying input data into memberships, wherein test data with a known classification membership is provided to the fuzzy inference network and wherein the fuzzy inference network uses the fuzzy rules to generate classification memberships for the test data by firing the fuzzy rules with each fuzzy rule fired assigned a firing strength based on its match to the test data, and determining the fuzzy rule having the greatest firing strength, where the membership functions of the rule having the greatest firing strength are compared to the known classification membership of the test data to determine classification error and wherein the firing frequency count of each fuzzy rule is stored.

The system of the present invention provides an improved fuzzy inference network for on-line classification of high-dimensional data, wherein the fuzzy inference network generates a rule base of fuzzy rules, with each fuzzy rule assigned to a class label, and each fuzzy rule including at least one membership function corresponding to a dimension of the data, with each membership function including membership function parameters, wherein the fuzzy rules are used for classifying input data into memberships, wherein test data with a known classification membership is provided to the fuzzy inference network and wherein the fuzzy inference network uses the fuzzy rules to generate classification memberships for the test data by firing the fuzzy rules with each fuzzy rule fired assigned a firing strength based on its match to the test data, and determining the fuzzy rule having the greatest firing strength, where the membership functions of the rule having the greatest firing strength are compared to the known classification membership of the test data to determine classification error and wherein the firing frequency count of each fuzzy rule is stored, the improvement comprising a rule tuning and learning rule application processor connected with the fuzzy inference network to receive the fuzzy rules; the classification error, the firing strength, the firing frequency count, and the classification membership generated by of the fuzzy rule having the greatest firing strength; the test data, and the known classification memberships for the test data; the processor operative for determining whether the firing strength of the fuzzy rule having the greatest firing strength exceeds a predetermined threshold; and in the case where the firing strength of the fuzzy rule having the greatest firing strength exceeds the threshold, tuning the fuzzy rule based on the classification error; and in the case where the firing strength of the fuzzy rule having the greatest firing strength does not exceed the threshold, determining whether the classification membership generated by the fuzzy rule having the greatest firing strength correctly matches the known classification membership of the test data;

in the case where the classification membership generated by the fizzy rule having the greatest firing strength does not correctly match the known classification membership of the test data, tuning the fuzzy rule based on the classification error; and in the case where the classification membership generated by the fuzzy rule having the greatest firing strength correctly matches the known classification membership of the test data, applying a learning rule to update the membership function parameters such that the classification error is minimized for high-dimensional classification tasks.

In a further embodiment, the system of the present invention, the rule tuning and learning rule application processor is further operative to:

apply a fuzzy similarity measure to compare the membership function along each dimension of the test data with the test data;

add a new membership function along those dimensions where the fuzzy similarity measure is not satisfied;

create a new fizzy rule including the new membership functions and those membership functions that satisfied the fuzzy similarity measure; and add the new rule to the rule base.

In another embodiment of the system of the present invention, the rule tuning and learning rule application processor is further operative to:

assign a mean value to each new membership function equal to the value of the test data corresponding to the dimension corresponding the respective new membership function;

increment the firing frequency count for new fuzzy rule; and assign a classification membership to the new fizzy rule matching the classification membership of the test data for which the rule fired.

In a another embodiment of the system of the present invention, the membership functions are Gaussian membership functions, the membership function parameters of each Gaussian membership function include a mean and a variance, and the learning rule applied updates the mean and variance of the Gaussian membership functions of the fuzzy rule having the greatest firing strength according to:

$$\mu^* = \left(1 - \frac{|e|}{f}\right)\mu + \frac{|e|}{f}x, \text{ and}$$

$$\sigma^* = \sqrt{\left(1 - \frac{|e|}{f}\right)\sigma^2 + \frac{|e|}{f}(\sigma - x)^2}, \text{ where}$$

where $\mu^*$ represents the updated mean of the Gaussian membership function, $\sigma^*$ represents the updated variance of the Gaussian membership function, $\mu$ represents the non-updated mean σ of the Gaussian membership function, σ represents the non-updated variance of the Gaussian membership function, |e| represents the classification error for the Gaussian membership function, x represents the particular value of the test data for the dimension corresponding to the Gaussian membership function, and f represents the firing frequency for the particular fuzzy rule to which the learning rule is applied.

In a further embodiment of the present invention, the system further comprises an on-line learning fuzzy inference network wherein the fuzzy inference network generates a rule base of fizzy rules, with each fuzzy rule assigned to a class label, and each fuzzy rule including at least one membership function corresponding to a dimension of the data, with each membership function including membership function parameters, wherein the fuzzy rules are used for classifying input data into memberships, wherein test data with a known classification membership is provided to the fuzzy inference network and wherein the fuzzy inference network uses the fuzzy rules to generate classification memberships for the test data by firing the fuzzy rules with each fuzzy rule fired assigned a firing strength based on its match to the test data, and determining the fuzzy rule having the greatest firing strength, where the membership functions of the rule having the greatest firing strength are compared to the known classification membership of the test data to determine classification error and wherein the firing frequency count of each fuzzy rule is stored.

The present invention further comprises a rule base generated by either the method or the system of the present invention.

BRIEF DESCRIPTION OF THE DRAWINGS

The invention will now be described by way of exemplary embodiments with reference to the accompanying simplified, diagrammatic drawings. In the drawings:

FIG. 5 is a table showing a performance comparison of an embodiment of the present invention with the SONFIN and M-PROBART networks.

DESCRIPTION

Figure 1:
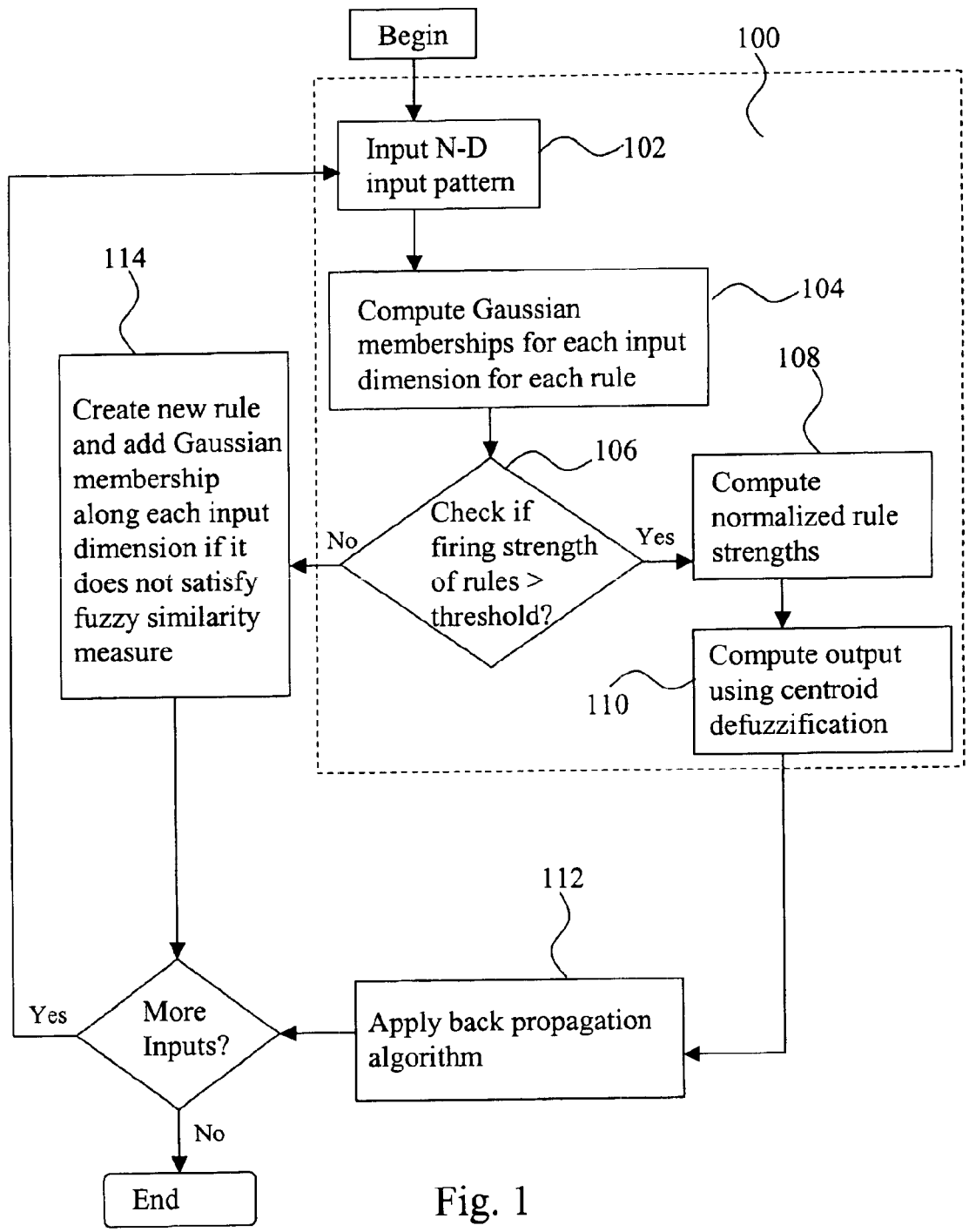
FIG. 1 is a flow diagram depicting the operation of the SONFIN.

The present invention relates to expert systems, and more particularly to on-line fuzzy inference systems tailored for processing high-dimensional classification problems. The following description is presented to enable one of ordinary skill in the art to make and use the invention and to incorporate it in the context of particular applications. Various modifications to the preferred embodiment, as well as a variety of uses in different applications will be readily apparent to those skilled in the art, and the general principles defined herein may be applied to other embodiments. Thus, the present invention is not intended to be limited to the embodiments shown, but is to be accorded the widest scope consistent with the principles and novel features disclosed herein.

GLOSSARY

The following terms are defined in order to assist the reader in gaining a fuller understanding of the terminology used in this description:

activation function: the activation function is a function representing a behavior of the node or layer of nodes that allows a particular input to trigger the node or nodes in order to cause the signal to propagate to the next layer.

firing frequency count: each time a rule is fired, a counter is incremented. This provides a measure of the frequency with which the rule has been used. The firing frequency can simply increment every time a rule is fired, or it can increment only when a rule is fired with a firing strength in excess of a particular threshold.

firing strength: each time a rule is used to match with the test data, it is considered to be "fired". The firing strength is a measure of how strongly the rule reacts to the test data, and is determined through the coefficients of the rule.

high-dimensional data: for purposes of the present invention, high-dimensional data generally refers to data for which the number of inputs exceeds 10.

learning/training: the present invention enables a rule base for a fuzzy inference engine to be incrementally developed through on-line learning (as opposed to batch learning, where all learning is accomplished in one procedure). The rule base may then be embodied in software to be run on a computer or in hardware.

membership function: the membership functions are distribution functions which accommodate fuzzy membership, non-limiting examples of which include Gaussian, triangular, and trapezoidal membership functions. Gaussian membership functions are considered the preferred membership functions for the present invention.

membership function parameters: the membership functions have parameters such as, for the case of Gaussian membership functions, a mean and variance, which define the shape of the membership function, and hence its response to an input. These membership functions may be iteratively adjusted or replaced depending on their match with the input data and their resulting usefulness for data classification.

processor: the present invention can embodied as software on a general purpose computer or a special purpose computer, and is also readily adaptable to embodiments in hardware.

INTRODUCTION

Current fuzzy inference networks used for on-line learning are limited to use in the classification of low-dimensional data. The present invention extends the ability of current fuzzy inference networks to facilitate classification of high-dimensional data. With current fuzzy inference networks, because the classification process depends on the multiple of an increasing number of values between 0 and 1, the overall multiple becomes increasingly small, eventually resulting in numbers too small to be computationally practical. An object of the present invention is to divorce the dependency fizzy inference network's operation from the number of dimensions in the data classified. Two operations are employed to this end: tuning the fuzzy rules based on the classification error; and applying a learning rule to update the membership function parameters.

Fuzzy Inference Networks

Figure 2:
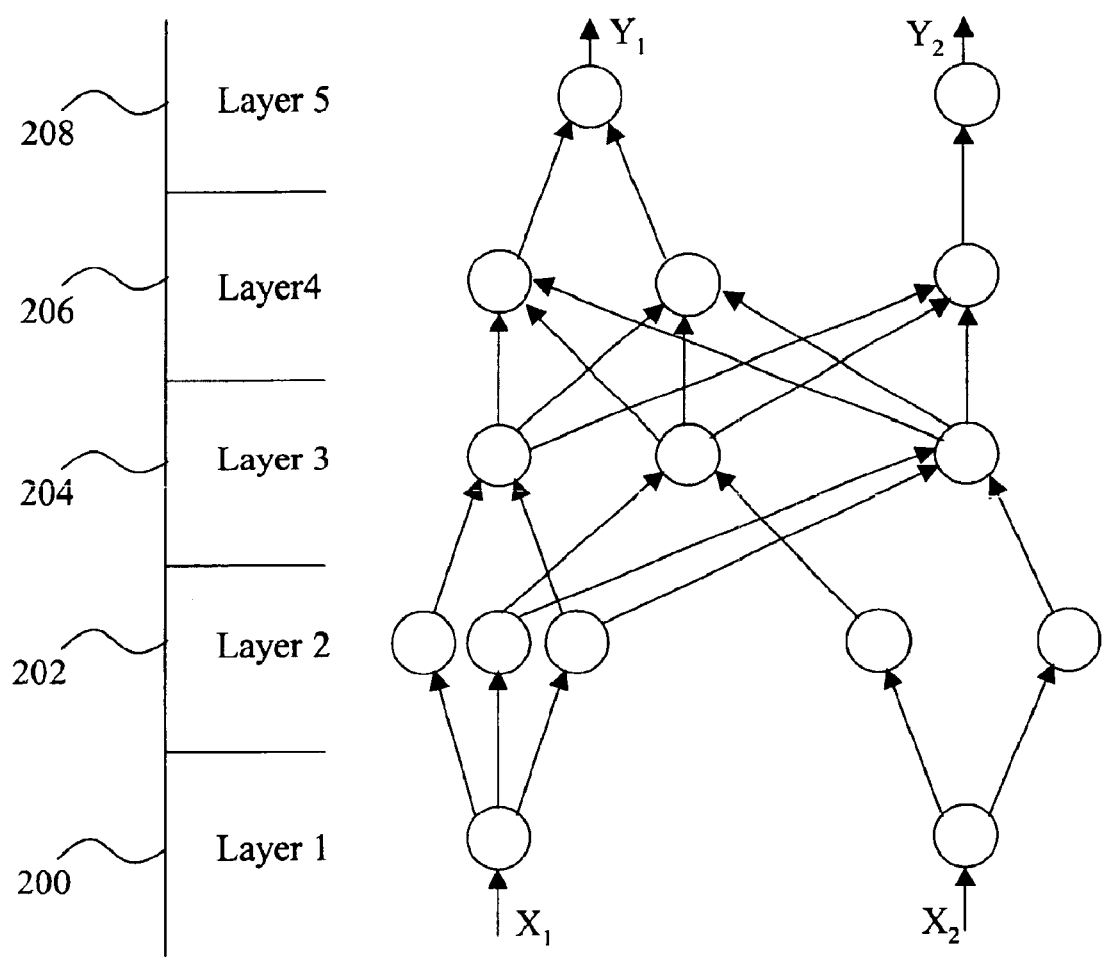
FIG. 2 is a nodal diagram depicting a 5-layer neural network with which the present invention may be used.

The self-constructing fuzzy inference network (SONFIN) is an example of an on-line learning fuzzy inference network to which the current invention may be applied. A node diagram of a 5-layer neural network, exemplified by the SONFIN is shown in FIG. 2. The following description of the SONFIN is intended to provide a framework within which the present invention may be better understood and to provide an example of a fuzzy inference network to which the present invention may be applied.

The SONFIN may be embodied as a five-layered network, comprising a plurality of nodes, wherein each node within a layer has an integration function that combines the information or evidence from other nodes. The integration function at each node provides the net input at each node as follows:

net input=$f[u_1^{(k)}, u_2^{(k)}, \ldots, u_p^{(k)}; w_1^{(k)}, w_2^{(k)}, \ldots, w_p^{(k)}]$ where, $u_1^{(k)}, u_2^{(k)}, \ldots, u_p^{(k)}$ are the inputs to the node and $w_1(k), w_2(k), \ldots, w_p^{(k)}$ are the associated link weights. The superscript k in the above equation represents the layer number. Along with the integration function f, every node has an activation function $a()$, which gives, for layer 1 200:

$o_i^{(k)} = a(f)$, which represents the node output as a function of the node input via the activation function $a()$.

Layer Descriptions

Each of the layers in the SONFIN will be now be described in terms of their function with respect to the overall network.

Layer 1 200:

Each node in the layer 1 200 corresponds to one input variable. The first layer performs no computation and simply transmits the input values to the second layer. The link weights in the first layer are all set equal to 1. The activation function in this case is the same as the integration function:

$f = u_i^{(1)}; a^{(1)} = f$

Layer 2 202:

The SONFIN attempts to combine neural and fuzzy approaches to train neural networks. The use of fuzzy methods helps to provide interpretability of the rules generated by the trained network. To accommodate linguistic interpretation of the network, layer 2 202 relates the linguistic label (e.g. small, big, low, high, etc.) with the input variables. Linguistic labels corresponding to the input variables can be ascertained through the use of mapping functions (e.g. a multi-dimensional Gaussian function). The parameters corresponding to the linguistic labels are learned during the training phase. For each input variable, the membership in each linguistic label may be obtained easily. The function performed at layer 2 202 is as follows:

$$f(u_{ij}^{(2)}) = -\frac{(u_i^{(2)} - m_{ij})^2}{\sigma_{ij}^2}; a^{(2)}(f) = \exp(f)$$

where $m_{ij}$ and $\sigma_{ij}$ represent the mean and variance of the Gaussian membership function corresponding to each of the linguistic terms.

Layer 3 204:

A node in layer 3 204 represents one fuzzy logic rule and performs precondition matching of a rule. The link weights in this layer are unity. The links in this layer determine what linguistic terms of the input variables are relevant for a rule. The following AND operation is used at each node in layer 3 204:

$$f(u_i^{(3)}) = \prod_i u_i^{(3)} = \exp(-(D_i(x - m_i))^T(D_i(x - m_i))); a^{(3)}(f) = f$$

where $D_i = \text{diag}(1/\sigma_{i1}, 1/\sigma_{i2}, \ldots, 1/\sigma_{in})$ $m_i = (m_{i1}, m_{i2}, \ldots, m_{in})$, and x represents the n-dimensional input pattern. The outputs of the nodes in layer 3 204 represent the firing strengths of the corresponding fuzzy rules.

Layer 4 206:

As in layer 3 204, the link weights in this layer are equal to 1. The number of nodes in layer 4 206 is equal to the number of nodes in layer 3 204. The firing strengths calculated in layer 3 204 are normalized in layer 4 206 by the following operation:

$$f(u_i^{(4)}) = \sum_i u_i^{(4)}; a^{(4)}(f) = u_i^{(4)}/f$$

Layer 5 208:

Once the normalized rule firing strengths are obtained, they need to be combined together to generate a classification decision. In the SONFIN, rules are associated with classes, and hence the normalized rule outputs of a particular class are weighted and averaged. This process is also known as defuzzification, and involves the following operation:

$$f(u_i^{(5)}) = \sum_i w_i^{(5)} u_i^{(5)} = \frac{f}{\sum_i w_i^{(5)}}$$

Once the defuzzification process is completed for each of the output nodes, the node with the largest output determines the class of the input pattern. In the SONFIN, the number of rule nodes in layer 3 204 grows as more inputs are presented. This growth is based on thresholding the firing strengths of each existing rule. If the firing strength of all the existing rules is below a threshold, then a new rule node is created to represent the current input-output mapping. In this manner, the structure of the SONFIN evolves or self-organizes as data is presented.

Another important feature during the rule generation process is the pruning of the membership functions (e.g. the Gaussian, triangular, or trapezoidal membership functions) that are recruited along each dimension for a newly formed rule. When a new rule is formed, the membership functions along each dimension are checked for fuzzy similarity with other membership functions along the dimension that already exists due to previously formed rules. If the similarity is high (as defined by the user), the Gaussian membership for the new rule is not added and vice versa.

The basic SONFIN includes the ability to tune the parameters of the network. Parameter tuning is performed in order to constantly update the parameters (e.g. mean and variance) of the membership functions such that they are tuned to minimize misclassification. In order to perform parameter tuning, the SONFIN applies the back-propagation algorithm. First the links in layer 5 208 ($w_i^{(5)}$'s) are updated. Then the error is propagated all the way back to the layer 2 202, where the parameters of each membership function is updated in proportion to the firing strength of the rule it represents. Details regarding back-propagation methods are provided by the references provided in the background.

As more input patterns are presented, the parameters of the network are tuned and the network structure evolves simultaneously. While SONFIN performs very well for low dimensional classification as well as function approximation, the network has problems when the number of input dimensions begins to become large (in excess of 10 input features).

The layer 3 204 of SONFIN, which represents the rule layer, is created by forming a product of 1-dimensional membership functions where each dimension of the membership functions represents an input feature dimension. This method of combining the membership values from individual membership functions is known as the product rule in fuzzy logic. Gaussian membership functions are the preferred class of membership functions because they provide for computational simplicity (specifically because an N-dimensional Gaussian function can be readily decomposed as a product of N 1-dimensional Gaussian membership functions, aiding the rule-elucidation process). Unfortunately, the product rule becomes detrimental during the parameter tuning/learning process if the number of input dimensions becomes large. As previously stated, the learning employed in SONFIN is performed using the back-propagation algorithm. The idea behind tuning using the back-propagation algorithm is to shift the parameters of the membership functions of each rule such that the error in misclassification is minimized. When the errors are back-propagated from the layer 5 208 (the output layer) to layer 2 202 (where the parameters of the membership functions are updated), a major problem arises when the input is high-dimensional. The error that is back-propagated to layer 2 202 to update the parameters of the membership functions of a rule depends upon the firing strength of that rule. The firing strength of a rule is determined by the output of the N-dimensional membership functions (i.e., the product rule). Thus, if there are too many input features, then the firing strength of the rule becomes prohibitively small. For example, if there are 20 inputs, and if the membership values for each dimension are 0.7, then the product rule will result in the firing strength of the rule being 0.000797922. The problem is obviously exacerbated as the number of dimensions increases. The following is an example of employing Gaussian membership functions that illustrates this effect in more detail. For a 1-dimensional normal distribution, it is well known that:

$$\int_{-\sigma}^{\sigma} \exp(-(x/\sigma)^2) \, dx = 0.68$$

Assuming that there is a multi-dimensional Gaussian, that a diagonal covariance matrix is used, and that all the diagonal elements of the covariance matrix are the same and equal to $\sigma^2$, the multi-dimensional Gaussian can be factorized into the 1-dimensional Gaussians along each of the dimensions. It may be trivially shown that:

$$\int_{-\sigma}^{\sigma}\int_{-\sigma}^{\sigma}\int_{-\sigma}^{\sigma} \ldots \int_{-\sigma}^{\sigma} \exp(-(x_1/\sigma)^2)\exp(-(x_2/\sigma)^2)$$
$$\ldots \exp(-(x_n/\sigma)^2) dx_1 dx_2 \ldots dx_n = 0.68^n$$

where n represents the dimensionality of the input space. For n=20, the equation is equal to $0.68_{20}=0.00045$. This implies that most of the Gaussian cores (i.e. regions that are closest to the mean, the $\pm\sigma$) are empty. Thus, when n is large, there is no chance for a rule to fire with appreciable strength (where firing strength of a rule is the product of n 1-dimensional Gaussians) to make any changes to Gaussian parameters during back propagation learning. Thus, most points appear to be far from the mean of the multidimensional Gaussian. Extremely small values of the firing strength, in turn, result in very small changes to the mean and variance of the Gaussians during back-propagation learning, hence resulting in negligible learning.

Another important bottleneck in the basic SONFIN is the basis for rule creation. If the firing strengths of all the currently existing rules is below a user-defined threshold, then a new rule is created, implying that the current location and size (i.e., mean and variance, respectively, in a Gaussian membership function) of the membership functions that represent the current rule base is inadequate to represent the current input pattern. The SONFIN attempts to overcome this problem in two ways. The first was to create a new rule by recruiting new membership functions along each input dimension such that the current input is correctly represented in the future. The other is by using the parameter tuning process to adjust the location and the size of the membership functions. The parameter tuning becomes necessary when the firing strength of at least one of the rules is greater than the threshold, but represents the wrong class. In that case, the SONFIN attempts to correct the problem by parameter tuning using back-propagation. This means that the created rules can be wrongly assigned to a class with no learning possible to correct the mistake. Thus, for high dimensional problems, the SONFIN essentially becomes a poor clustering algorithm with a class label attached to each cluster. This not only affects the prediction capabilities of SONFIN, but also creates a prohibitively large number of rules.

DETAILS OF THE PRESENT INVENTION

Figure 3:
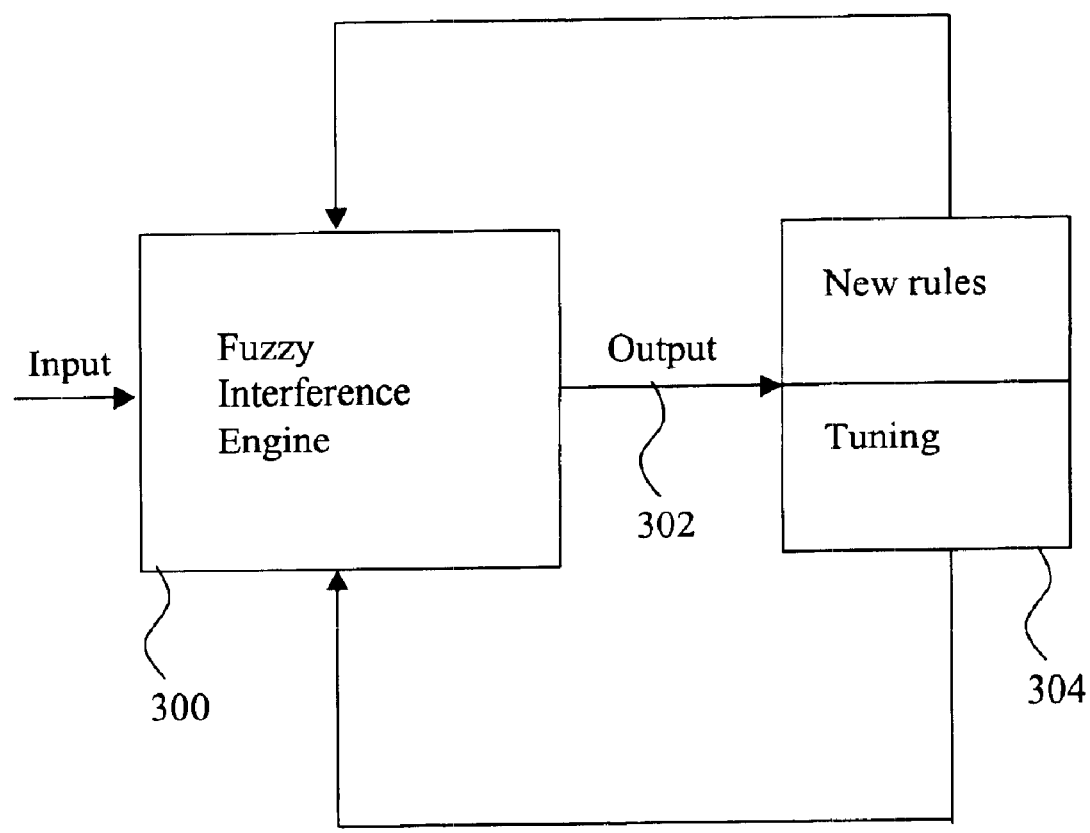
FIG. 3 is a block diagram showing the components of the present invention in addition to an on-line learning fuzzy inference network such as the SONFIN.

The present invention deals with high dimensional classification tasks while using an on-line learning fuzzy inference network such as the SONFIN. A block diagram depicting the basic architecture of an embodiment of the present invention is shown in FIG. 3. The on-line learning fuzzy inference network 300 represents a network such as the SONFIN. The output 302 of the on-line learning fuzzy inference network 300 is provided to a rule tuning and learning law application processor 304. The rule tuning and learning law application processor 304 provides two functions.

First, a threshold-based criterion for rule recruiting is used to determine whether the firing strength of the fuzzy rule with the greatest firing strength for the input exceeds a predetermined threshold. If the firing strength of the rule exceeds the predetermined threshold, which is set to ensure that a fuzzy rule provides a large enough output for computational effectiveness, the rule is tested to determine whether it properly classified the input data. If the fuzzy rule properly classified the input data, a learning rule is applied to update the parameters of the membership functions of the fuzzy rule. The learning rule helps to ensure that the membership functions of the fuzzy rule have minimal overlap with the membership functions of other fuzzy rules along the same dimension. If the fuzzy rule did not properly classify the input data or if the firing strength of the fuzzy rule with the greatest firing strength for the input data did not exceed the predetermined threshold level, then the a new fuzzy rule is created and added to the rule base by applying a fuzzy similarity measure between each membership function of the rule and the corresponding input data for the dimension corresponding to the membership function and generating the new fuzzy rule incorporating both new membership functions corresponding to those dimensions for which the fuzzy similarity measure was not satisfied and those membership functions of the original fuzzy rule corresponding to those dimensions for which the fuzzy similarity measure was satisfied. If it is assigned to the correct class label, then the rule is created. The new self-organization process is improved because it does not allow for proliferation of rules, but yet ensures accuracy by assigning the rules to the correct classification label.

The new learning rule is not based on back-propagation, but is based on error weighted k-means algorithm that is independent of the input dimensions. A new parameter called frequency of firing count f is introduced for each fuzzy rule (represented as a node in FIG. 2). This parameter represents the cumulative number of times each rule in layer 3 204 of the fuzzy inference network has fired. The frequency of firing provides a statistical measure of importance of a rule for the classification task. If the frequency of firing of a given rule is high, then a large number of input samples that have been presented to the network are being represented by the rule, and vice versa. The new learning rule utilizes the frequency of firing for each rule. The other important parameter that the learning law uses is the error |e| in classification. Generally, the error |e| in classification may be defined as the absolute value between the output class value and the value assigned to the correct class. Using these two parameters, the updates for the mean and variance in the case of Gaussian membership functions in the new learning law are written as:

$$\mu^*_{ij} = \left(1 - \frac{|e|}{f_j}\right)\mu_{ij} + \frac{|e|}{f_j}x_i$$

$$\sigma^*_{ij} = \sqrt{\left(1 - \frac{|e|}{f_j}\right)\sigma^2_{ij} + \frac{|e|}{f_j}(\sigma_{ij} - x_i)^2}$$

where the pairs $\mu^*_{ij}$ and $\sigma^*_{ij}$, and $\mu_{ij}$ and $\sigma_{ij}$, represent, respectively, the adjusted and unadjusted mean and variance of the $I^{th}$ Gaussian membership function for the $J^{th}$ rule that is the maximally firing rule for the current input $x_i$ (for i=1, ..., N, where N is the number of input dimensions). The present invention employs the new learning law as follows. When a new rule J is created, it is directly assigned to the correct class label. This means that |e| will be zero and that the mean of the Gaussian membership function for each dimension is set as the input itself. The variance is set to a predefined initial width $\sigma_{omot}$. The frequency of firing count $f_J$ for rule J is incremented. When the next input is presented, and if an existing rule is selected based on its firing strength exceeding the predetermined threshold, then the membership function parameters (typically the mean and variance of the membership functions) are updated based on the magnitudes of the error in classification |e| and the frequency of firing count $f_J$ the rule. So, if the rule is relatively new, then its frequency of firing is low and so the magnitude of classification error plays an important role in adjusting the mean and variance of the Gaussian membership functions. When a rule has fired several times in the past, the frequency of firing count $f_J$ increases, so the effect of error in misclassification starts to diminish for that rule, causing the creation of a new rule. In this manner, the rules created are more robust because importance is given to their past, and yet in the formative stages of a rule, a lot of weight is given to the misclassification errors |e|, with the goal of shifting the membership function parameters to compensate for the misclassification error. Another possible variant is to prevent updating the frequency of firing for a rule if |e| is greater than a user-defined threshold. This variation will result in more parameter tuning for the Gaussian membership functions of a given rule and thus minimize the number of rules created. Importantly, and unlike the basic SONFIN, the present invention does not permit misclassification of a rule with the wrong class label assigned. Also, the update equations of the present invention do not depend on the firing strength of the rule $f_J$, thereby avoiding the problems associated with high-dimensional classification that the basic SONFIN encounters. Thus, the learning equations used in the present invention combined with the self-organization process provide an on-line learning fuzzy inference network capable of learning high-dimensional classification problems.

Figure 4:
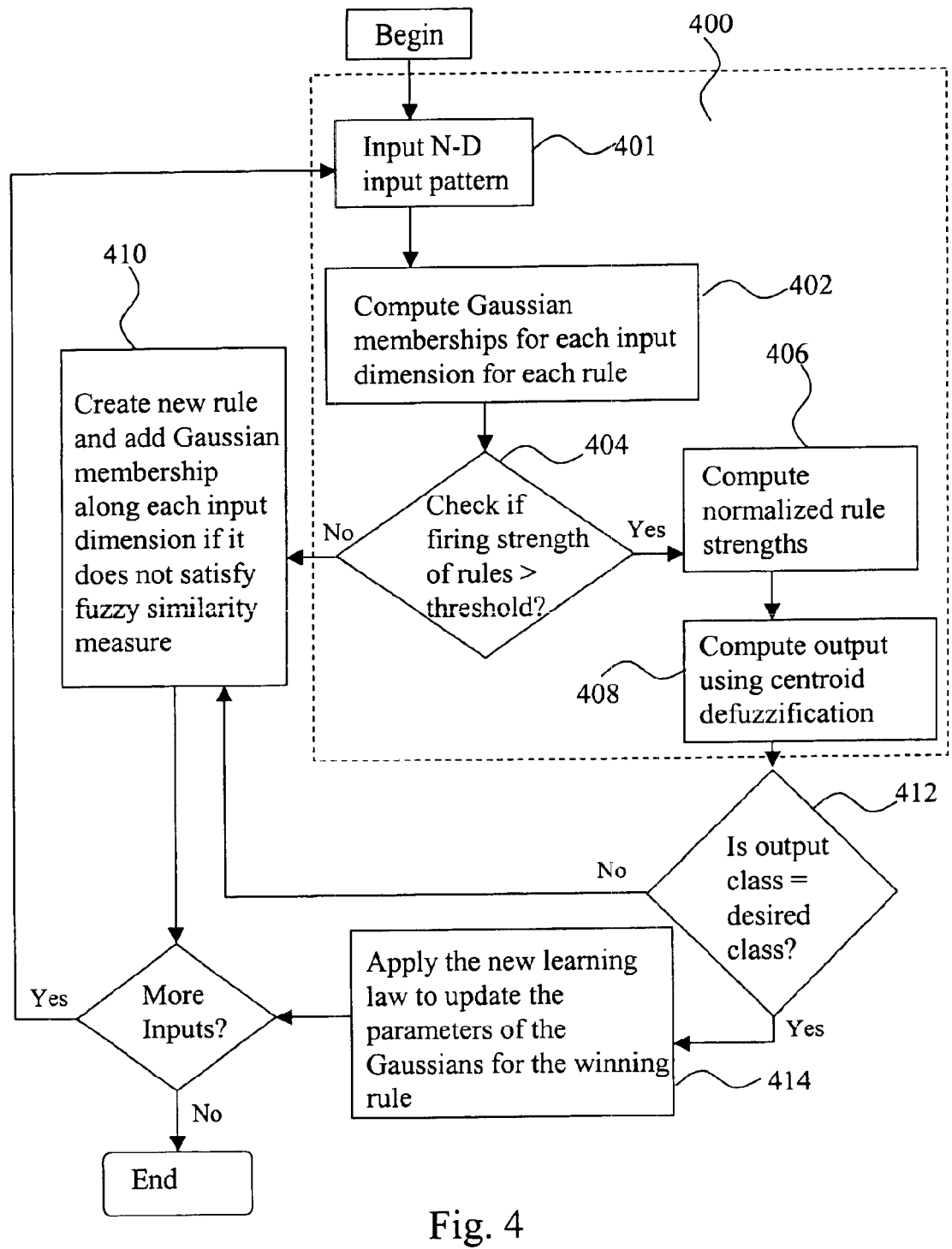
FIG. 4 is a flow chart demonstrating the steps in the method of the present invention.

A flowchart detailing the method of the present invention is provided in FIG. 4. This diagram provides a flow depiction of the present invention incorporating a SONFIN-type network as provided in FIG. 1, with extensions and modifications that allow it to perform effectively with high-dimensional inputs. As in FIG. 1, a portion of the flow diagram represents a generic fuzzy inference network 400, which is adapted for on-line learning based on the SONFIN. The SONFIN provides the adaptations necessary to provide on-line learning. In an inputting step 401, an N-dimensional input pattern is provided to the fuzzy inference network 400. The fuzzy inference network 400 then computes the membership values for each input dimension for each rule in a membership value computation step 402. The firing strength of the rules is determined based on the input and is checked to determine whether it exceeds a predetermined threshold in a firing strength checking step 404. If the firing strength exceeds the threshold, then the fuzzy inference network 400 computes normalized rule strengths for the rule in a normalizing step 406. The fuzzy inference network 400 then computes an output using centroid defuzzification in a defuzzifying step 408. In the steady-state operation of a trained network, the result of the defuzzifying step 408 is the output of the fuzzy inference network 400. After checking to determine whether the firing strength of the rules exceeds the threshold in the firing strength checking step 404, if the rule exceeds the threshold, a fuzzy similarity measure is applied between the fuzzy rule having the greatest firing strength and the test data in a rule tuning step 410. The fuzzy similarity measure checks each membership function of the fizzy rule to determine whether it is satisfied along each corresponding dimension of the input data A new rule is created from a combination of those membership functions that satisfied the fuzzy similarity measure and new membership functions to replace those membership functions that did not satisfy the fuzzy similarity measure. The parameters of the new membership functions are set to match the input data (e.g. the mean is set equal to the value of the input data along the dimension to which the membership function corresponds and a preset variance is provided). The frequency of firing strength $f_J$ for the new rule is incremented so that eventually, as the rule is used, the learning rule may be applied. Also, a classification label is provided for the new rule to match the classification for the input data for which the rule was created. Both the new and the old rule are retained in the rule base, and the fuzzy inference network 400 may accept more input data. If the firing strength of the rules do not exceed the threshold as determined in the firing strength checking step 404, the fuzzy rule having the greatest firing strength is checked to determine whether it correctly classified the input data in an output class checking step 412. If the rule incorrectly classified the input data, the rule tuning step 410 is applied to the rule, and the fuzzy inference network 400 may accept more input data. If the rule correctly classified the input data, then after the normalizing step 406 and the defuzzifying step 408, the learning rule is applied to update the parameters of the rule having the greatest firing strength in a learning law application step 414 and the fizzy inference network 400 may accept more input data.

Once a fuzzy inference network 400 is sufficiently trained on-line using the present invention, the resulting rule base may be embodied in either software operated on a general purpose or special purpose processor, or may be incorporated directly in hardware. The ability to embody the rule base in hardware generally provides for much faster operation for classifying data than a comparable software embodiment.

Results

Evaluations have been conducted to determine the performance of the present invention using 1-dimensional infrared range profile sensor data combined with weight sensors for vehicular occupant recognition. Sensor data used contained 31 features: 30 beams with range information of the occupant in a car seat measured from a fixed location in the car and an additional signal from a weight sensor that measures the average weight of the occupant that is occupying the seat. The results are shown in FIG. 5 for three data sets, wherein the task was to classify the occupant in the seat into one of several categories and to determine whether to enable an airbag. In the first data set, the classification task was to disable the airbag for rear facing infant seats (RFIS) and to enable the airbag for front facing child seats (FFCS), free roaming 35 lb children, front facing infant seats (FFIS), and adults in normal positions. Here, the free roaming 35 lb children tend to make the weight sensor reading noisier than FFCS and FFIS. Adults out-of-position (OOP) were not included in the first data set. The second data set was identical to the first data set, except that the OOP were to be classified as enable. In the third data set, the classification task was to disable for FFIS and enable for FFCS, adults in normal position, free roaming 35 lb children and OOP. In this data set, RFIS examples were absent. These tasks have varying levels of difficulty due to the amount of overlap in the sensor features for these situations. It is important to note that these applications are high dimensional classification tasks and that in order to simulate on-line learning, the data was presented to the system in a single pass with learning occurring on each input pattern presented.

The three data sets were used to train a network of the present invention as well as networks of the SONFIN and the M-PROBART types. As previously stated, the performance of the present invention is summarized in the table of FIG. 5. Two different performance measures were used to compare the results of the present invention with those of the other networks. The first measure was accuracy in prediction performance on the test data (i.e., not the training data set). From the table, it may be seen that the accuracy of prediction on the test set using the present invention is much better than that of the SONFIN and comparable to that of the M-PROBART for all of the data sets. Since SONFIN is reduced to a poor clustering algorithm due to problems with high-dimensional inputs, the accuracy in prediction is inferior to that of the present invention. The better accuracy of the M-PROBART compared to SONFIN can be attributed to a self-organization process that accounts for mismatches in output class assignments similar to that of the present invention. The second performance measure used was the number of rules generated. For the present invention, this measure was superior to both the M-PROBART and the SONFIN-type networks. In the case of SONFIN, the difference in size of the rule base extracted is again due to the inability to learn in high-dimensional spaces. For the M-PROBART, the difference in the rule base was primarily due to the absence of any parameter tuning mechanism. Unlike the present invention and SONFIN, the M-PROBART also does no pruning of the Gaussians along each dimension. In summary, the results show that the present invention is not only accurate, but that it is also more compact in the size of its rule base when compared to the two leading on-line learning algorithms currently available in the literature. The result is primarily due to the new learning law and the self-organization process devised to learn in an on-line fashion for high-dimensional classification tasks.

What is claimed is:

1. An improved method for generating an on-line learning fuzzy inference network for the classification of data using an on-line learning fuzzy inference network, wherein the fuzzy inference network is trained in order to generate a rule base of fuzzy rules, with each fuzzy rule assigned to a class label, and each fuzzy rule including at least one membership function corresponding to a dimension of the data, with each membership function including membership function parameters, wherein the fuzzy rules are used for classifying input data into memberships, wherein test data with a known classification membership is provided to the fuzzy inference network and wherein the fuzzy inference network uses the fuzzy rules to generate classification memberships for the test data by firing the fuzzy rules with each fuzzy rule fired assigned a firing strength based on its match to the test data, and determining the fuzzy rule having the greatest firing strength, where the membership functions of the rule having the greatest firing strength are compared to the known classification membership of the test data to determine classification error, the improvement comprising:

a. storing a firing frequency count and incrementing the firing frequency count for each fuzzy rule, indicating the number of times the fuzzy rule has been fired;

b. determining whether the firing strength of the fuzzy rule having the greatest firing strength exceeds a predetermined threshold;

c. in the case where the firing strength of the fuzzy rule having the greatest firing strength exceeds the threshold, tuning the fuzzy rule based on the classification error; and d. in the case where the firing strength of the fuzzy rule having the greatest firing strength does not exceed the threshold, determining whether the classification membership generated by the fuzzy rule having the greatest firing strength correctly matches the known classification membership of the test data;

i. in the case where the classification membership generated by the fuzzy rule having the greatest firing strength does not correctly match the known classification membership of the test data, tuning the fuzzy rule based on the classification error as in step c; and ii. in the case where the classification membership generated by the fuzzy rule having the greatest firing strength correctly matches the known classification membership of the test data, applying a learning rule to update the membership function parameters such that the classification error is minimized for high-dimensional classification tasks.

2. A rule base generated by the method of claim 1.

3. An improved method for generating an on-line learning fuzzy inference network for the classification of data using an on-line learning fuzzy inference network as set forth in claim 1, wherein the tuning step c of the improvement further comprises the sub-steps of:
   i. applying a fuzzy similarity measure to compare the membership function along each dimension of the test data with the test data;
   ii. adding a new membership function along those dimensions where the fuzzy similarity measure is not satisfied;
   iii. creating a new fuzzy rule including the new membership functions and those membership functions that satisfied the fuzzy similarity measure; and
   iv. adding the new rule to the rule base.

4. An improved method for generating an on-line learning fuzzy inference network for the classification of data using an on-line learning fuzzy inference network as set forth in claim 3, wherein the tuning step c of the improvement further includes the sub-steps of:
   i. assigning a mean value to each new membership function equal to the value of the test data corresponding to the dimension corresponding the respective new membership function;
   ii. incrementing the firing frequency count for new fuzzy rule; and
   iii. assigning a classification membership to the new fuzzy rule matching the classification membership of the test data for which the rule fired.

5. A rule base generated by the method of claim 4.

6. An improved method for generating an on-line learning fuzzy inference network for the classification of data using an on-line learning fuzzy inference network as set forth in claim 4, wherein the membership functions are selected from the group consisting of Gaussian membership functions, triangular membership functions, and trapezoidal membership functions.

7. An improved method for generating an on-line learning fuzzy inference network for the classification of data using an on-line learning fuzzy inference network as set forth in claim 4, wherein the membership functions are Gaussian membership functions, and the membership function parameters of each Gaussian membership function include a mean and a variance, and wherein the learning rule applied in the case of step d(ii) updates the mean and variance of the Gaussian membership functions of the fuzzy rule having the greatest firing strength according to:

$$\mu^* = \left(1 - \frac{|e|}{f}\right)\mu + \frac{|e|}{f}x, \text{ and}$$

$$\sigma^* = \sqrt{\left(1 - \frac{|e|}{f}\right)\sigma^2 + \frac{|e|}{f}(\sigma - x)^2}, \text{ where}$$

where $\mu^*$ represents the updated mean of the Gaussian membership function, $\sigma^*$ represents the updated variance of the Gaussian membership function,
$\mu$ represents the non-updated mean of the Gaussian membership function,
$\sigma$ represents the non-updated variance of the Gaussian membership function, $|e|$ represents the classification error for the Gaussian membership function,
x represents the particular value of the test data for the dimension corresponding to the Gaussian membership function, and f represents the firing frequency for the particular fuzzy rule to which the learning rule is applied.

8. An improved method for generating an on-line learning fuzzy inference network for the classification of data using an on-line learning fuzzy inference network as set forth in claim 1, the membership functions are Gaussian membership functions, and where the membership function parameters of each Gaussian membership function include a mean and a variance, and wherein the learning rule applied in the case of step d(ii) updates the mean and variance of the Gaussian membership functions of the fuzzy rule having the greatest firing strength according to:

$$\mu^* = \left(1 - \frac{|e|}{f}\right)\mu + \frac{|e|}{f}x, \text{ and}$$

$$\sigma^* = \sqrt{\left(1 - \frac{|e|}{f}\right)\sigma^2 + \frac{|e|}{f}(\sigma - x)^2}, \text{ where}$$

where $\mu^*$ represents the updated mean of the Gaussian membership function, $\sigma^*$ represents the updated variance of the Gaussian membership function,
$\mu$ represents the non-updated mean of the Gaussian membership function,
$\sigma$ represents the non-updated variance of the Gaussian membership function, $|e|$ represents the classification error for the Gaussian membership function,
x represents the particular value of the test data for the dimension corresponding to the Gaussian membership function, and f represents the firing frequency for the particular fuzzy rule to which the learning rule is applied.

9. A rule base generated by the method of claim 8.

10. An improved method for generating an on-line learning fuzzy inference network for the classification of data comprising the steps of:
   a. providing an on-line learning fuzzy inference network, wherein the fuzzy inference network generates a rule base of fuzzy rules, with each fuzzy rule assigned to a class label, and each fuzzy rule including at least one membership function corresponding to a dimension of the data, with each membership function including membership function parameters, wherein the fuzzy rules are used for classifying input data into memberships, wherein test data with a known classification membership is provided to the fuzzy inference network and wherein the fuzzy inference network uses the fuzzy rules to generate classification memberships for the test data by firing the fuzzy rules with each fuzzy rule fired assigned a firing strength based on its match to the test data, and determining the fuzzy rule having the greatest firing strength, where the membership functions of the rule having the greatest firing strength are compared to the known classification membership of the test data to determine classification error and wherein the firing frequency count of each fuzzy rule is stored, the improvement comprising:
   b. determining whether the firing strength of the fuzzy rule having the greatest firing strength exceeds a predetermined threshold;
   c. in the case where the firing strength of the fuzzy rule having the greatest firing strength exceeds the threshold, tuning the fuzzy rule based on the classification error; and
   d. in the case where the firing strength of the fuzzy rule having the greatest firing strength does not exceed the threshold, determining whether the classification membership generated by the fuzzy rule having the greatest firing strength correctly matches the known classification membership of the test data;
   i. in the case where the classification membership generated by the fuzzy rule having the greatest firing strength does not correctly match the known classification membership of the test data, tuning the fuzzy rule based on the classification error as provided in the case represented by c; and
   ii. in the case where the classification membership generated by the fuzzy rule having the greatest firing strength correctly matches the known classification membership of the test data, applying a learning rule to update the membership function parameters such that the classification error is minimized for high-dimensional classification tasks.

11. An improved training system for a fuzzy inference network for on-line classification of data including a fuzzy inference network for generating a rule base of fuzzy rules, with each fuzzy rule assigned to a class label, and each fuzzy rule including at least one membership function corresponding to a dimension of the data, with each membership function including membership function parameters, wherein the fuzzy rules are used for classifying input data into memberships, wherein test data with a known classification membership is provided to the fuzzy inference network and wherein the fuzzy inference network uses the fuzzy rules to generate classification memberships for the test data by firing the fuzzy rules with each fuzzy rule fired assigned a firing strength based on its match to the test data, and determining the fuzzy rule having the greatest firing strength, where the membership functions of the rule having the greatest firing strength are compared to the known classification membership of the test data to determine classification error, the improvement comprising:
   a firing frequency count calculated for each fuzzy rule and incremented each time the fuzzy rule is fired, the firing frequency count being stored in the processing device, and a rule tuning and learning rule application processor connected with the fuzzy inference network to receive the fuzzy rules; the classification error; the firing strength, the firing frequency count, and the classification membership generated by for the fuzzy rule having the greatest firing strength; the test data, and the known classification memberships for the test data; said processor operative for determining whether the firing strength of the fuzzy rule having the greatest firing strength exceeds a predetermined threshold; and
   a. in the case where the firing strength of the fuzzy rule having the greatest firing strength exceeds the threshold, tuning the fuzzy rule based on the classification error; and
   b. in the case where the firing strength of the fuzzy rule having the greatest firing strength does not exceed the threshold, determining whether the classification membership generated by the fuzzy rule having the greatest firing strength correctly matches the known classification membership of the test data;
      i. in the case where the classification membership generated by the fuzzy rule having the greatest firing strength does not correctly match the known classification membership of the test data, tuning the fuzzy rule based on the classification error; and
      ii. in the case where the classification membership generated by the fuzzy rule having the greatest firing strength correctly matches the known classification membership of the test data, applying a learning rule to update the membership function parameters such that the classification error is minimized for high-dimensional classification tasks.

12. A rule base generated by the training system of claim 11.

13. An improved training system for a fuzzy inference network for on-line classification of data as set forth in claim 11, wherein the rule tuning and learning rule application processor is further operative to:
   a. apply a fuzzy similarity measure to compare the membership function along each dimension of the test data with the test data;
   b. add a new membership function along those dimensions where the fuzzy similarity measure is not satisfied;
   c. create a new fizzy rule including the new membership functions and those membership functions that satisfied the fuzzy similarity measure; and
   d. add the new rule to the rule base.

14. An improved training system for a fuzzy inference network for on-line classification of data as set forth in claim 13, wherein the rule tuning and learning rule application processor is further operative to:
   a. assign a mean value to each new membership function equal to the value of the test data corresponding to the dimension corresponding the respective new membership function;
   b. increment the firing frequency count for new fuzzy rule; and
   c. assign a classification membership to the new fuzzy rule matching the classification membership of the test data for which the rule fired.

15. An improved training system for a fuzzy inference network for on-line classification of data as set forth in claim 14, wherein the membership functions are selected from the group consisting of Gaussian membership functions, triangular membership functions, and trapezoidal membership functions.

16. An improved training system for a fuzzy inference network for on-line classification of data as set forth in claim 14, wherein the membership functions are Gaussian membership functions, and the membership function parameters of each Gaussian membership function include a mean and a variance, and wherein the learning rule applied updates the mean and variance of the Gaussian membership functions of the fuzzy rule having the greatest firing strength according to:

$$\mu^* = \left(1 - \frac{|e|}{f}\right)\mu + \frac{|e|}{f}x, \text{ and}$$

$$\sigma^* = \sqrt{\left(1 - \frac{|e|}{f}\right)\sigma^2 + \frac{|e|}{f}(\sigma - x)^2}, \text{ where}$$

where $\mu^*$ represents the updated mean of the Gaussian membership function, $\sigma^*$ represents the updated variance of the Gaussian membership function,
$\mu$ represents the non-updated mean of the Gaussian membership function,
$\sigma$ represents the non-updated variance of the Gaussian membership function, $|e|$ represents the classification error for the Gaussian membership function,
x represents the particular value of the test data for the dimension corresponding to the Gaussian membership function, and f represents the firing frequency for the particular fuzzy rule to which the learning rule is applied.

17. An improved training system for a fuzzy inference network for on-line classification of data as set forth in claim 11, wherein the membership functions are Gaussian membership functions, and where the membership function parameters of each Gaussian membership function include a mean and a variance, and wherein the learning rule updates the mean and variance of the Gaussian membership functions of the fuzzy rule having the greatest firing strength according to:

$$\mu^* = \left(1 - \frac{|e|}{f}\right)\mu + \frac{|e|}{f}x, \text{ and}$$

$$\sigma^* = \sqrt{\left(1 - \frac{|e|}{f}\right)\sigma^2 + \frac{|e|}{f}(\sigma - x)^2}, \text{ where}$$

where $\mu^*$ represents the updated mean of the Gaussian membership function, $\sigma^*$ represents the updated variance of the Gaussian membership function, $\mu$ represents the non-updated mean of the Gaussian membership function, $\sigma$ represents the non-updated variance of the Gaussian membership function, $|e|$ represents the classification error for the Gaussian membership function, x represents the particular value of the test data for the dimension corresponding to the Gaussian membership function, and f represents the firing frequency for the particular fuzzy rule to which the learning rule is applied.

18. A rule base generated by the training system of claim 17.

19. An improved training system for a fuzzy inference network for on-line classification of data comprising:
  a. an on-line learning fuzzy inference network wherein the fuzzy inference network generates a rule base of fuzzy rules, with each fuzzy rule assigned to a class label, and each fuzzy rule including at least one membership function corresponding to a dimension of the data, with each membership function including membership function parameters, wherein the fuzzy rules are used for classifying input data into memberships, wherein test data with a known classification membership is provided to the fuzzy inference network and wherein the fuzzy inference network uses the fuzzy rules to generate classification memberships for the test data by firing the fuzzy rules with each fuzzy rule fired assigned a firing strength based on its match to the test data, and determining the fuzzy rule having the greatest firing strength, where the membership functions of the rule having the greatest firing strength are compared to the known classification membership of the test data to determine classification error and wherein the firing frequency count of each fuzzy rule is stored;
  b. a rule tuning and learning rule application processor connected with the fuzzy inference network to receive the fuzzy rules; the classification error; the firing strength, the firing frequency count, and the classification membership generated by the fuzzy rule having the greatest firing strength; the test data, and the known classification memberships for the test data; said processor operative for determining whether the firing strength of the fuzzy rule having the greatest firing strength exceeds a predetermined threshold; and
    i. in the case where the firing strength of the fuzzy rule having the greatest firing strength exceeds the threshold, tuning the fizzy rule based on the classification error; and
    ii. in the case where the firing strength of the fuzzy rule having the greatest firing strength does not exceed the threshold, determining whether the classification membership generated by the fuzzy rule having the greatest firing strength correctly matches the known classification membership of the test data;
    a. in the case where the classification membership generated by the fuzzy rule having the greatest firing strength does not correctly match the known classification membership of the test data, tuning the fuzzy rule based on the classification error; and
    b. in the case where the classification membership generated by the fuzzy rule having the greatest firing strength correctly matches the known classification membership of the test data, applying a learning rule to update the membership function parameters such that the classification error is minimized for high-dimensional classification tasks.

* * * * *

UNITED STATES PATENT AND TRADEMARK OFFICE
CERTIFICATE OF CORRECTION

PATENT NO. : 6,950,813 B2 Page 1 of 1
APPLICATION NO. : 09/840286
DATED : September 27, 2005
INVENTOR(S) : Narayan Srinivasa It is certified that error appears in the above-identified patent and that said Letters Patent is hereby corrected as shown below:

At column 5, line 16, "$\mu^*$" should read --$\mu$--.

At column 5, line 17, "updated mean a" should read --updated mean σ--.

At column 6, line 43, "fizzy" should read --fuzzy--.

At column 9, line 45, the equation "$\alpha^{(1)=}f$" should read --$\alpha^{(1)}=f$-- (The equal sign should not be superscripted).

At column 10, line 65, "$w_i^{(5)}$'s" should read --$w_i^{(5)'}$s-- (The apostrophe should be a prime symbol).

At column 11, line 66, the number "$0.68_{20}$" should read --$0.68^{20}$--.

At column 13, line 50, "$\sigma_{omot}$" should read --$\sigma_{init}$--.

Signed and Sealed this

Sixth Day of May, 2008

JON W. DUDAS
*Director of the United States Patent and Trademark Office*